(12) United States Patent
Dressler

(10) Patent No.: US 6,613,412 B1
(45) Date of Patent: Sep. 2, 2003

(54) CARRIER FOR DECORATIVE GRAPHICS AND LETTERING

(75) Inventor: Donald R. Dressler, Glastonbury, CT (US)

(73) Assignee: Stahl's Inc., St. Clair Shores, MI (US)

( * ) Notice: Subject to any disclaimer, the term of this patent is extended or adjusted under 35 U.S.C. 154(b) by 1335 days.

(21) Appl. No.: 08/847,414

(22) Filed: Apr. 24, 1997

Related U.S. Application Data

(63) Continuation of application No. 08/493,508, filed on Jun. 22, 1995, now abandoned, which is a continuation of application No. 08/126,574, filed on Sep. 24, 1993, now abandoned.

(51) Int. Cl.[7] ............................ B32B 7/06; B32B 27/30; B32B 27/36; B32B 27/40
(52) U.S. Cl. ...................... 428/41.8; 428/346; 428/352; 428/349; 428/347; 428/355 EN; 428/355 AC; 428/355 N; 428/42.3; 428/42.1; 428/40.1; 428/483; 428/913; 428/914; 428/423.1; 428/424.2; 428/424.4; 428/515; 428/520; 428/522; 428/334; 428/339
(58) Field of Search ................................ 428/346, 352, 428/355 R, 349, 483, 913, 914, 41.8, 42.3, 42.1, 347, 355 EN, 355 AC, 355 N, 40.1, 332, 334, 339, 423.1, 424.2, 424.4, 515, 520, 522

(56) References Cited

U.S. PATENT DOCUMENTS

| | | | |
|---|---|---|---|
| 3,660,212 A | 5/1972 | Liebe | 161/41 |
| 3,922,435 A | * 11/1975 | Asnes | 428/349 |
| 4,035,532 A | 7/1977 | Gregorian et al. | 428/90 |
| 4,292,100 A | 9/1981 | Higashiguchi | 156/72 |
| 4,314,813 A | 2/1982 | Masaki | 8/468 |
| 4,340,632 A | 7/1982 | Wells et al. | 428/90 |
| 4,423,106 A | 12/1983 | Mahn | 428/207 |
| 4,640,727 A | 2/1987 | Janssen | 156/240 |
| 4,652,478 A | 3/1987 | Maii | 428/43 |
| 4,704,310 A | * 11/1987 | Tighe et al. | 427/261 |
| 4,731,149 A | 3/1988 | Dowzall et al. | 156/541 |
| 4,735,854 A | 4/1988 | Lauchenauer | 428/347 |
| 4,786,349 A | 11/1988 | Mahn | 156/234 |
| 4,810,549 A | 3/1989 | Abrams et al. | 428/88 |
| 4,869,957 A | 9/1989 | Vankerckhoven et al. | 428/352 |
| 4,902,364 A | 2/1990 | Parker et al. | 156/233 |
| 4,927,682 A | 5/1990 | Nagura et al. | 428/88 |
| 5,021,275 A | 6/1991 | Kim | 428/42 |
| 5,026,584 A | 6/1991 | Logan | 428/41 |
| 5,047,103 A | 9/1991 | Abrams | 156/72 |
| 5,073,423 A | 12/1991 | Johnson et al. | 428/40 |
| 5,098,772 A | 3/1992 | ef Strom | 428/211 |
| 5,112,423 A | 5/1992 | Liebe | 156/234 |
| 5,143,672 A | 9/1992 | Kuwahara | 264/132 |
| 5,167,750 A | 12/1992 | Myers | 156/583.9 |
| 5,196,080 A | 3/1993 | Mizobuchi et al. | 156/234 |
| 5,200,268 A | 4/1993 | Hamada | 428/354 |
| 5,207,851 A | 5/1993 | Abrams | 156/230 |
| 5,312,645 A | 5/1994 | Dressler | |

* cited by examiner

*Primary Examiner*—Vivian Chen
(74) *Attorney, Agent, or Firm*—Brooks & Kushman P.C.

(57) ABSTRACT

The invention relates to a hot peel carrier for decorative graphics and lettering applied to a substrate wherein the carrier has a film having opposite surfaces and an adhesive having a peel strength which decreases with increasing temperature, the adhesive being on a surface of the plastic film. The invention also provides a laminate for use in applying graphics to a substrate which incorporates the carrier, methods of using and methods of using the carrier and laminate disclosed herein. The various embodiments disclosed herein incorporating the aforementioned hot peel carrier have significant advantages stemming from the fact that immediate after a graphic is heat applied to a substrate, the adhesive of the carrier has substantially no adhesion to either the substrate or to the heated adhered graphic.

8 Claims, 5 Drawing Sheets

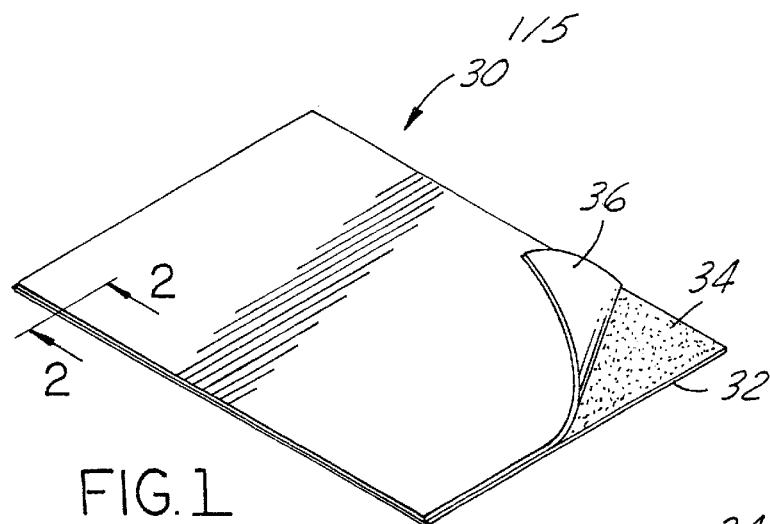
FIG. 1
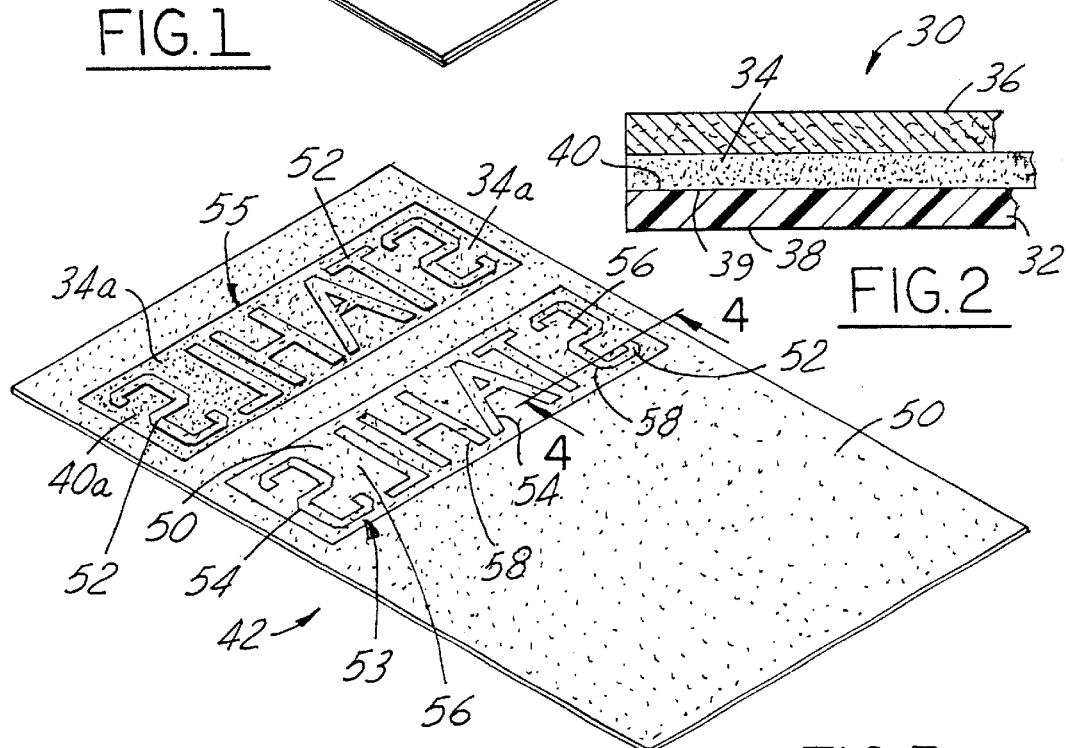
FIG. 2
FIG. 3
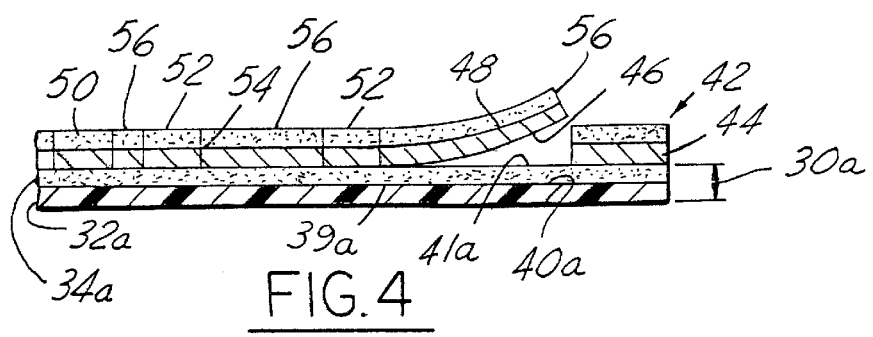
FIG. 4

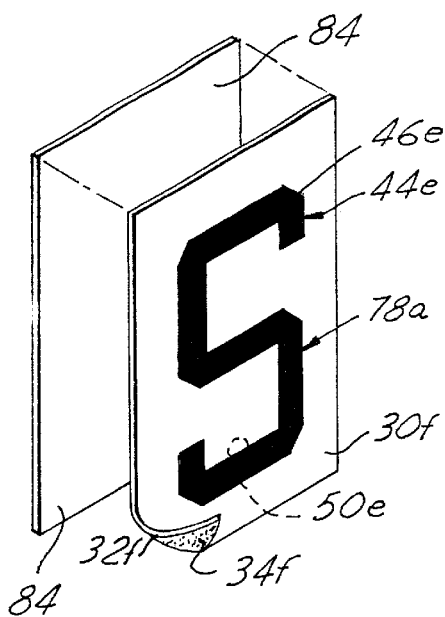
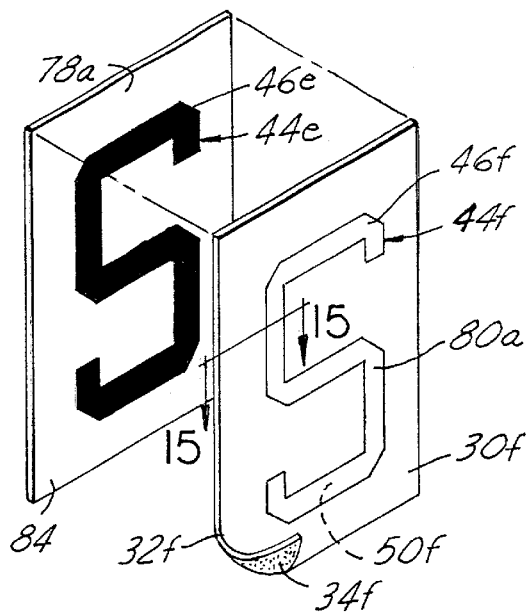
FIG.13    FIG.14
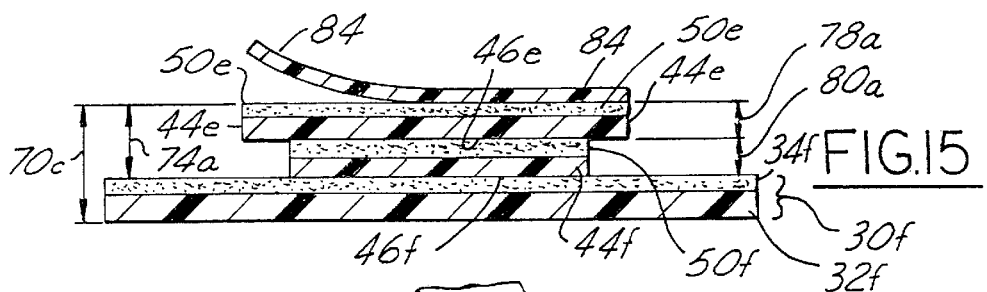
FIG.15
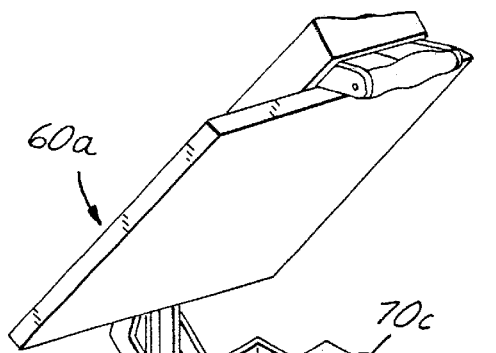
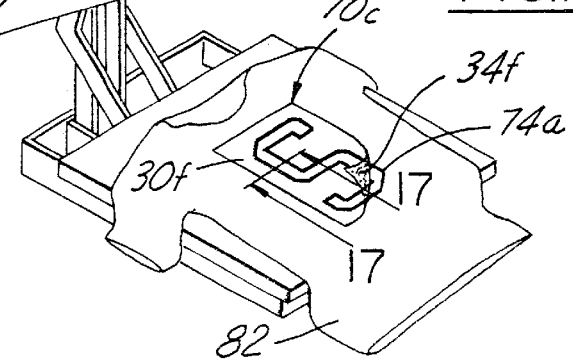
FIG.16

CARRIER FOR DECORATIVE GRAPHICS AND LETTERING

This application is a continuation of application Ser. No. 08/493,508, filed Jun. 22, 1995, abandoned, which is a continuation of application Ser. No. 08/126,574, filed Sep. 24, 1993, abandoned.

FIELD OF THE INVENTION

This invention generally relates to carriers and laminates used in the production and application of decorative graphics to be adhesively applied and methods of making and using the same. More particularly, the invention provides a substantially transparent carrier for graphics to be applied to a substrate, the carrier having a film with an adhesive thereon which has a peel strength which decreases with increasing temperature and which allows the carrier to be immediately removed from just-adhered graphics.

BACKGROUND OF THE INVENTION

Quick, easy and inexpensive methods of applying decorative graphics to a variety of substrates have long been desired. Examples of known methods of attaching decorative emblems and letters include sewing and the use of adhesives. The use of adhesives has been particularly practiced in the application of decorative graphics to fabric substrates of the type commonly found in sportswear and athletic garments such as team uniforms, jerseys, jackets and caps. Other examples of suitable garments capable of decoration with adhesively applied graphics are shorts, pants, T-shirts, sweatshirts, etc. Although the decorated garments must be highly durable and resistant to rough use, the cost of applying the graphics per garment must be low in terms of both time and money because of the large number of garments typically involved.

In general, the prior art has been unable to provide a single carrier capable of multiple advantages, i.e. (1.) holding a material from which a graphic may be cut securely enough to permit the cutting of intricate shapes therefrom with a computer guided blade, (2.) being adapted to retain a graphic thereon for transfer to a substrate on which the graphic is to be adhered, (3.) providing quick and easy registration of the graphic with respect to the desired location and orientation of the graphic on the substrate and (4.) simultaneously providing the capability of immediate removal of the carrier from the just-adhered graphic and underlying substrate without any damage to either. The later feature requires a minimization of the force required to remove the carrier from the graphic adhered substrate. Just-adhered graphics may be vulnerable to distortion and disruption from ripping or pulling forces employed to remove prior art carrier.

Thus, prior art carriers and laminates for use in the production and application of adhesively appliable graphics have generally been incapable of use with intricate cutting means and/or must be allowed to cool prior to removal from a graphic adhered substrate. While some paper coated release sheets do allow for immediate removal, they are limited to use with particular types of graphics. These paper carriers are often referred to as being capable of immediate or 'hot peel' removal because adherence of the graphic carried thereon to the substrate almost always requires the application of both heat and pressure. Thus, the graphic and underlying substrate are still hot when the paper carrier is immediately removed. Hot peel release of these paper carriers is generally facilitated by a change in the graphic material not the paper carrier. These paper carriers are opaque, however, making registration of the graphic to the substrate difficult. Also, they are generally incapable of serving as the carrier for a laminate from which intricate shapes can be cut with a computer controlled blade.

Several prior art patents have addressed these separate problems. For example, U.S. Pat. No. 3,660,212, issued to Liebe, Jr. and herein incorporated by reference, discloses heat applied athletic lettering having two layers of polyvinyl chloride bonded to each other. One of the layers of polyvinyl chloride is releasably adhered to a high gloss release paper sheet. Graphics are cut from the laminate and heat applied to the release coated paper sheet to cause one of the polyvinyl chloride layers to melt and encapsulate a desired fabric substrate.

However, the graphic material is generally not held securely enough to permit the formation of intricate detailed graphics.

More recently, U.S. Pat. No. 5,112,423 to Leibe, Jr. discloses an alignment maintaining plastic lettering material having three layers. The first layer is comprised of a pigmented display layer of a particular vinyl composition having first and second surfaces. On the first surface of the vinyl layer is a translucent release sheet of heat stabilized polyester onto which the vinyl layer has been solution cast. On the second surface of the vinyl lies a layer of non encapsulating thermoplastic adhesive, which is used to adhere the graphic to the substrate. It is believed that the release sheet of the Leibe, Jr. invention may not be removed until it has cooled to approximately room temperature.

U.S. Pat. No. 4,423,106 issued to Mahn discloses a laminated web consisting essentially of a polyester adhesive bonded to an extruded and rolled polyurethane lettering layer. The polyester layer is covered with a removable release sheet. The paper cover is removed, characters are die cut out of the web, the polyester adhesive layer is placed against a fabric substrate, a release coated paper cover is placed over the polyurethane layer and heat and pressure are applied. The melting point of the polyester adhesive is lower than of that of the polyurethane, so the polyester melts into the fabric to adhere the polyurethane graphic to the substrate.

Thus, despite the teachings of the prior art there remains the problem of being able to (1.) make decorative graphics from a laminate wherein the graphics are retained on the carrier of the laminate in an orientation which is a reverse or mirror image of the intended orientation of the graphic on the substrate, (2.) subsequently use the same laminate carrier to apply the graphic in a manner which allows the user of the carrier to see just how the graphics will appear on the substrate before they have been adhered thereto, and (3) have the option of immediately removing the same laminate carrier from the just applied graphic. The prior art has failed to resolve these problems while simultaneously providing a carrier for decorative graphics which is highly efficient in terms of production volume, has significant economic advantages and provides high quality decorative graphics.

Finally, the prior art has failed to provide a carrier which can provide these advantages as part of a laminate and also prove advantageous in other embodiments. It would be desirable to have a substantially transparent carrier with an adhesive upon which pre-formed graphics could be arranged in an orientation reverse from that intended on the substrate, which could provide easy registration with the substrate, could be removed immediately after adherence of the graphic and could be removed with a minimum amount of upwardly applied force so as to not damage the just-adhered graphic or substrate.

Because such characteristics would provide significant commercial advantages in terms of ease of use, efficiency and economy, it is an object of this invention to provide a carrier for decorative graphics capable of providing these advantages.

In particular, it is an object of this invention to provide a carrier for adhesively applied graphics which is capable of adequately securing the graphic during the graphic formation and application processes but which may be immediately removed from a graphic adhered substrate, wherein the removal of the carrier is effected with substantially little or no damage to the just applied graphic.

It is a further object of the invention to provide a laminate from which decorative graphics may be cut where the laminate enjoys the same advantage of the carrier of the invention.

It is another object of the invention to provide a method of applying a graphic to a substrate wherein a preformed graphic may be applied to the carrier of the invention and retained thereon for quick and accurate registration on the substrate but wherein the carrier may be immediately removed from the graphic adhered substrate without the application of an upwardly directed force of a magnitude which would distort or damage the just-adhered graphic.

It is also an object of this invention to provide the carrier and laminates discussed above from which graphics having a wide variety of compositions may be formed and/or subsequently applied to a variety of different substrates.

Finally, it is an object of this invention to provide methods of making and applying multiple component and multicolored graphics using the carrier of the invention.

SUMMARY OF THE INVENTION

The instant invention addresses the deficiencies of the prior art by providing a carrier for graphics adhesively applied to a substrate, the carrier having a plastic film having opposite surfaces and an adhesive having a peel strength which decreases with increasing temperature. The adhesive is on or in direct, contiguous contact with at least one surface of the plastic film. The plastic film with the carrier thereon is substantially transparent and is adapted to retain a graphic thereon for transfer to a substrate, said peel strength of the adhesive being sufficiently reduced with increased temperature that the carrier may be removed from a just applied graphic without damaging the graphic.

In general, the carrier adhesive will have a particular tack. As used herein, tack may be defined as the property of an adhesive which enables it to form a bond of measurable strength immediately upon contact with another surface. Tack may also be referred to as "instantaneous" adhesion or may intuitively be recognized as the property of "stickiness." In general, the carrier adhesive will have sufficient tack or stickiness so as to bond at room temperature, a material from which decorative graphics may be cut, securely enough to permit the cutting of intricate shapes, with the use of computer aided cutting means. However, at elevated temperatures of from 200° F. to 350° F., the tack will be substantially reduced or negligible to human touch.

Those skilled in the art will appreciate that peel strength is merely one measurable aspect of the general property known in the art as tack. In quantitative terms, the carrier adhesive will have a peel strength of between 4 to 20 ounces per square inch of width at room temperature. More preferably the peel strength will be from 5 to 10 ounces per square inch. Peel strength as used herein is defined as the force necessary to strip a piece of the carrier at a 180° angle from a stainless steel panel at a pulling rate of 12 inches per minute as generally described in ASTM method D-903. Room temperature may be generally defined as from 60° to 90° F. When the carrier adhesive is exposed to temperatures of about 250° F. or greater, generally up to 350° F., the peel strength of the carrier adhesive will be substantially reduced. In particular, at such temperatures the peel strength will be less than 3 ounces per square inch of width and most preferably will be 1 ounce per square inch of width.

Thus, with the application of increasing temperatures, the stickiness or tackiness as measured by the peel strength of the carrier adhesive will decrease with increasing temperatures, such that at temperatures of 200° F. or more the carrier adhesive is substantially non-sticky and has substantially no tack. As the elevated temperatures are removed and the carrier cools down to room temperature, the stickiness or tackiness of the carrier adhesion will increase to the levels previously enjoyed prior to the application of the elevated heat. It will thus be appreciated that the carrier adhesive as disclosed herein has a peel strength which reversibly decreases with increasing temperature. The carrier adhesive of the instant invention does not transfer any residue or "stickiness" to the graphic or desired substrate irrespective of its peel strength.

The carrier of the invention may be utilized in the form of a laminated web or laminate. Such laminates are eminently suited for use in the production of decorative graphics intended to be adhesively applied to a variety of substrates, and most preferably to fabric substrates. After the formation of the decorative graphic, the laminated web or laminate may be used as a means of adhering the graphic to a desired substrate.

The laminates will be comprised of the carrier of the instant invention, a substantially contiguous layer of a material from which a graphic may be cut which is positioned on the carrier adhesive, and a substantially continuous layer of a means for adhering a graphic positioned on the graphic material layer.

The graphic material may be a thermoplastic, a thermoplastic containing material, or a cuttable material such as paper. Preferably, the graphic material will be a thermoplastic layer. Most preferably it will be polyurethane film.

On top of this substantially contiguous layer of graphic material is a substantially contiguous layer of a means for adhering a graphic. The layer of graphic adherent means may be activated by heat, pressure or combinations of both. Most preferably, the graphic adherent means will be an adhesive activated by the application of both heat and pressure and most preferably by heat sufficient to cause temperatures of 200° F. or more. In general, pressures anywhere between 1 to 20 pounds per square inch (psi) are suitable. Pressure of from 3 to 8 psi are most preferred.

However, even if the graphic adherent means may be actuated solely by pressure, i.e. a pressure sensitive adhesive, sufficient heat will still be applied so as reduce the peel strength of the carrier such that the carrier may be immediately removed from a just applied graphic without damaging the graphic. Typically, temperatures of from 200° F. or more will be applied so as to reduce the peel strength to about 3 oz/in$^2$ or less. Most preferably, temperatures of from 250° to 350° F. will be applied. It will be appreciated that because such application of heat is necessary for immediate removal of the carrier from a just adhered graphic, it is reasonable to use a graphic adherent means which is activated by in the same temperature range.

The laminated webs made according to the instant invention are particularly suitable when used in the process of making decorative graphics. Such laminates can be readily cut by cutting means well known in the art which will cut only through the layers of graphic material and graphic adherent means. The carrier of the instant invention comprised of the substantially transparent plastic film and carrier adhesive will not be cut through, although some scoring of the plastic film may occur.

Examples of suitable cutting means include carbide knives, laser cutting, kiss cuts, steel ruled dies, etc. Most preferably, computer controlled blades or knives will be employed to cut a reverse or mirror image graphic pattern or outline. Such graphic patterns may include intricate and/or small letters that may be either connected or separated from each other.

Those portions of the graphic material and graphic adherent means which are outside the outline of the decorative graphic will be peeled away from the carrier adhesive. Such processes may be defined as "weeding out" and may be successfully done with the use of small tools which exert sufficient force to pull the non-desired portions of the graphic material and graphic adherent mean layers away from the carrier adhesive.

The resulting web will be transparent except for those remaining portions of the graphic material and graphic adherent layers which form the graphic.

It will be appreciated that cutting means such as computer controlled blades or knives may be employed to cut intricate shapes out of the thermoplastic layer because of the strong adherence of the carrier adhesive at room temperature to the substantially contiguous layer of graphic material. In general, such adherence will result when the carrier adhesive has a peel value of from 4 to 20 $oz/in^2$. Such valves will typically result when the most preferred carrier adhesive is at room temperature.

When it is desired to apply decorative graphics to a substrate, the transparent carrier is advantageous because it enables the instantaneous and completely accurate alignment of the many components of a multi-component decorative graphic. When the user of the carrier positions the carrier such that the graphic adherent layer is juxtaposed with respect to the substrate, the various components of the decorative graphic will be orientated with respect to each other just as they will be after the application. Registration of the overall graphic to the substrate can be accomplished quickly and easily because the carrier user can see the substrate through the substantially transparent carrier. Costly and almost impossible to fix mistakes in alignment caused by human error and movement of the substrates will be essentially negligible since human contact with the various graphic components and the substrate are minimized.

Those skilled in the art will appreciate that significant reductions in the time spent in preparing and positioning the decorative graphic on a substrate will be substantially reduced as compared to prior art methods. As long as the alignment and relationship of the decorative graphics is correct on the carrier adhesive, the desired relationship will be achieved on the substrate. It will be appreciated that when the carrier is viewed from the back, the graphic image will be in reverse. Alternatively, when the carrier is viewed from the front, the graphic will be orientated as it will appear after application.

As indicated above, most preferably, sufficient heat will be applied to the laminated web during graphic application, so as to cause the peel strength of the carrier adhesive to decrease to a value which is less than 3 ounce per square inch of width. Sufficient heat will be such as to cause the temperature of the carrier to be increased to 200° F. or more. Most preferably, sufficient heat will be added so as to cause the carrier of the laminated web to be at a temperature between 300° F. to 350° F. In the absence of such heat and temperatures, the removal of the carrier of the instant invention will require the application of upwardly directed forces sufficient to overcome the maximum peel strength of the carrier to the just applied graphic.

Sufficient force in the form of heat, pressure or a combination thereof, will be applied to the laminated web when it is positioned on the substrate in order to activate the graphic adherent means. The graphic adherent means will preferably be selected so as to be activated by a combination of both. Most preferably, the graphic adhesive will be activated by a combination of heat between 300° F. to 350° F. and pressure of from 1 to 6 psi. In this most preferred instance, a combination of sufficient heat and pressure will be applied so as to cause the graphic adherent means to adhere the graphic material of the graphic to the desired substrate while simultaneously causing the peel strength of the carrier adhesive to decrease to a level of less than 3 ounces per square inch of width. However, those skilled in the art will appreciate that the graphic adherent means may be a pressure activated adhesive only.

It will thus be appreciated that heat will always be applied when using the carrier of the instant invention to provide the capability of immediate or hot peel removal of the carrier. Pressure may be applied as required for the activation of the graphic adherent mens. A particularly desirable means for applying heat or heat and pressure to the various embodiments of the instant invention is the heat sealing machine disclosed and illustrated in U.S. Pat. No. 5,167,750 to Myers, which is herein incorporated by reference. The heat sealing machine disclosed therein is capable of applying temperatures from 200 to 400° F. and pressure from 0 to 4.5 psi. Other heat sealing machines of this type capable of exerting pressures of up to 15.6 psi may be used with the instant invention.

In an alternative embodiment, the carrier of the invention may be utilized as a means for applying previously cut or formed graphics. In such an embodiment, the decorative graphics and/or lettering may be comprised of a variety of materials including but not limited to thermoplastic, fabrics, cloth, paper and combinations thereof. Examples of suitable thermoplastics are polyurethane and vinyl as well as thermoplastic mixtures having ingredients which upon exposure to heat or pressure expand in size. It will be appreciated that the latter are known as puff type thermoplastic mixtures.

Examples of suitable fabrics are twill, cotton, and felt. A particularly suitable form of fabric lettering is set forth in U.S. Pat. No. 5,149,388 to Stahls'. Flock materials such as those commonly known in the art and discussed in U.S. Pat. No. 5,047,103 to Abrams may also be utilized. It will be appreciated that numerous other types of materials may be suitable for use as precut decorative graphics.

The precut decorative graphics whether comprised of thermoplastic, fabric, flock, paper or combinations thereof will have a layer of graphic adherent material positioned on the side of the graphic material opposite from that which is in contact with the carrier adhesive. The graphic adherent means will be such as disclosed immediately above with respect to the laminated web.

When the carrier of the instant invention is utilized as a means for adhering precut decorative graphics, the decorative graphics will be applied to the carrier adhesive in an orientation which is a reverse or mirror image of that desired on the substrate. When the user of the carrier desires to apply the graphics to a substrate the carrier will be turned over such that the graphic adherent layer of the pre-cut graphic is immediately parallel to the desired substrate. Thus, the user looking down will see the decorative graph in the "correct" orientation, i.e., as desired on the substrate. The carrier will then be lowered and positioned so that the graphic adherent means is in intimate contact with the desired substrate. Application of sufficient force such as heat, or heat and pressure will cause the graphic adherent means to be activated so as to adhere the precut decorative graphic to the desired substrate and allow for the immediate removal of the carrier from the just applied graphic without damaging the graphic.

Finally, it is possible with the instant invention to provide a methods of making and applying multiple component decorative graphics having graphic material components of different colors or compositions. Two methods are contemplated.

First, the carrier of the instant invention may be used to apply a first decorative graphic to a temporary support structure. The temporary support structure will be a material which will have a bond strength with the graphic adherent which is greater than the bond strength between the graphic material and the carrier adhesive when the carrier adhesive is at elevated temperatures of from 200° F. or more. However, this same temporary support structure must have a bond strength with the graphic adherent means which is less than the bond strength between the graphic material and the carrier adhesive when the carrier adhesive is at room temperature. The temporary support structure will preferably be a paper sheet having a release coating thereon.

The carrier is removed immediately after the application of sufficient heat or heat and pressure to cause the graphic to be adhered to the temporary support structure and the peel strength of the carrier adhesive to be sufficiently reduced so as to allow immediate removal of the carrier without damage to the graphic. Typically this will occur when heat from 200 to 350° F. is applied and the peel strength of the carrier is reduced to less than 3 ounces per square inch and most preferably, less than 1 ounce per square inch.

Subsequently, a second decorative graphic is applied to the temporary support structure having the first graphic adhered thereon. It may be applied directly on to the upper surface of the first decorative graphic previously adhered to the temporary support. Alternatively, it may be positioned so as to be overlapping or in close proximity to the first decorative graphic. Such considerations are limited only by the imagination of the carrier user.

After the application of sufficient heat and/or pressure to cause the second decorative graphic to adhere to the first decorative graphic, the entire assembly is allowed to cool without the carrier being removed from the second decorative graphic. The resulting structure of the temporary support structure, the various graphic components and the carrier of the instant invention may be termed a decorative composite. As the temperature of the decorative composite is allowed to cool, the peel strength of the carrier adhesive increases. When the temperature of the decorative composite is approximately room temperature, the temporary support structure is removed from the composite, leaving both the second and first decorative graphics adhered to each other and/or to the carrier adhesive of the carrier. Subsequently, the first and second decorative graphics adhering to the carrier adhesive may be applied to a substrate, such as a fabric substrate. Upon the application of sufficient heat or heat and pressure, the graphic adherent means of both the first and second decorative graphics will adhere to the desired substrate and the carrier will be capable of immediate removal. Immediately after the application of sufficient heat, the carrier may be removed from the surface of the first and second decorative graphics without damage thereto. Those skilled in the art will appreciate that carrier removal may be delayed until the carrier cools to room temperature so long as the bond strength of the graphic adherents and substrate is greater than the bond strength of the graphic material and the carrier adhesive at room temperature.

Alternatively, such multiple component, multi-colored decorative graphics may be prepared immediately and directly upon the desired substrate using sequential applications. In such cases, the first decorative graphic will be applied to the desired substrate in a registered fashion corresponding to that of the ultimately desired location of the graphic on the substrate. With the application of sufficient heat or heat and pressure, the substantially negligible force required to remove the carrier from the first adhered graphic results in almost no displacement or distortion of the underlying substrate or to the adhered graphic. As a result, a second decorative graphic, will be positioned on or by the first adhered graphic. If the second graphic is on the first graphic, the adherent means of the second graphic will be in intimate contact with the decorative graphic material of the first adhered graphic. Sufficient heat or heat and pressure will be applied so as to cause the graphic adherent layer of the second decorative graphic to adhere to either the surface of the first decorative graphic or the substrate and the peel strength of carrier adhesive to simultaneously decrease so as to allow for immediate carrier removal.

Immediately after said application of heat, the carrier is removed with substantially negligible upward applied force. As a result, the multi-colored and/or multiple component decorative graphic may be assembled directly onto a desired substrate. When the carrier is immediately removed, little or no distortion of or damage to the underlying substrate or adhered graphics occurs. As a result, no misalignment of subsequently applied decorative graphics occurs. The use of the transparent carrier facilitates the positioning of the one or more decorative graphics upon the underlying substrate.

BRIEF DESCRIPTION OF THE DRAWINGS

FIG. 1 is a perspective view from the side of the carrier of the instant invention;

FIG. 2 is a cross-sectional view taken along the line 2—2 of FIG. 1;

FIG. 3 is a perspective view of the laminated web of the instant invention having a weeded out graphic and non-weeded out graphic;

FIG. 4 is a cross-sectional view taken along the line 4—4 of FIG. 3;

²MELINEX® is a trademark of ICI Corporation of Wilmington, Del.

Figure 9:
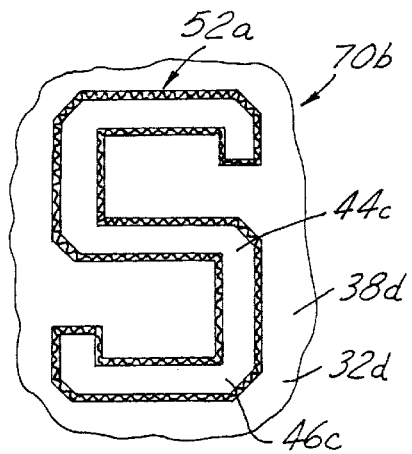
Figure 9A:
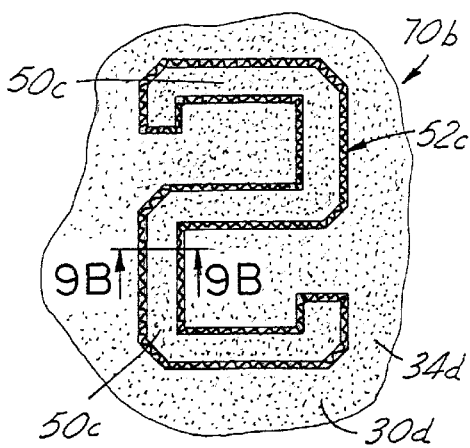
Figure 9B:
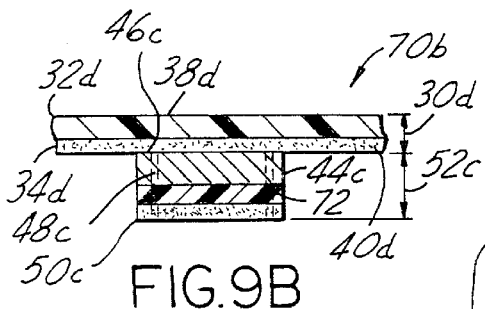
Figure 10:
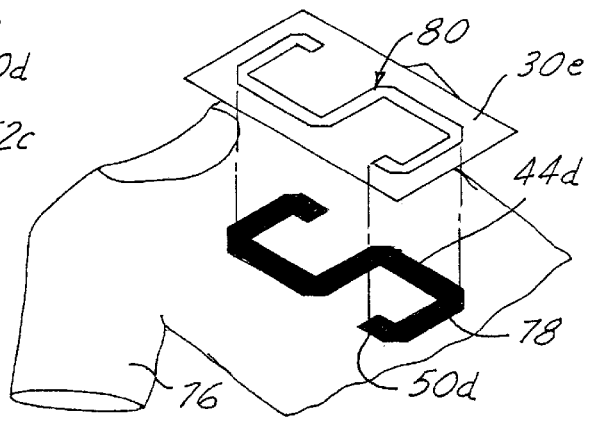
Figure 11:
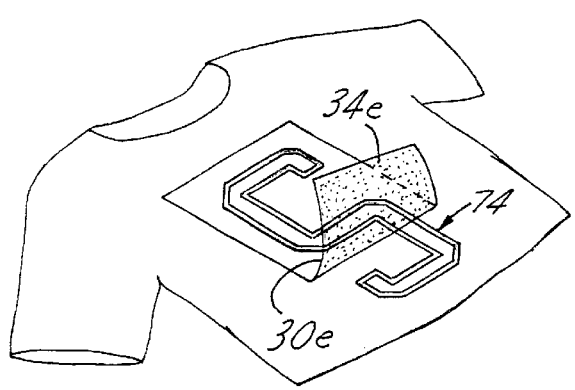
Figure 12:
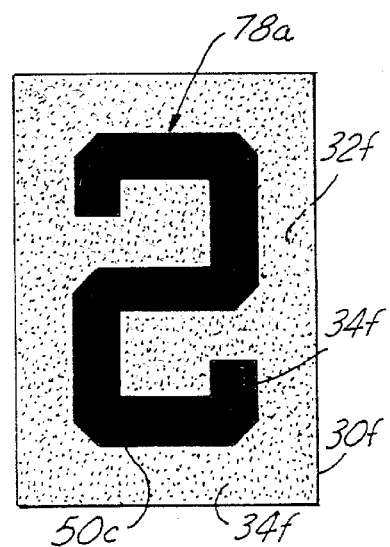
Figure 17:
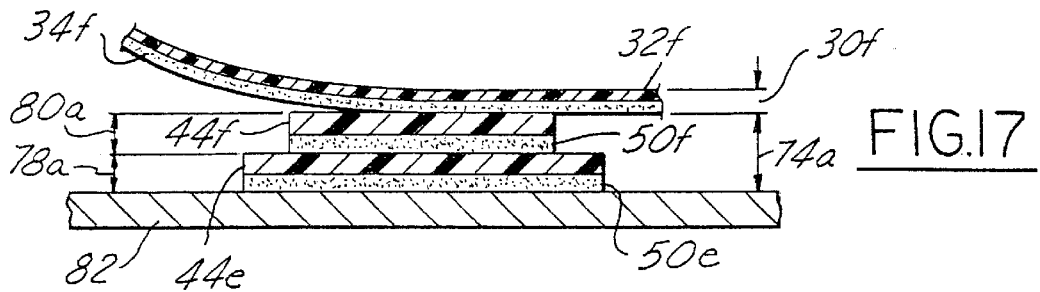
Figure 18:
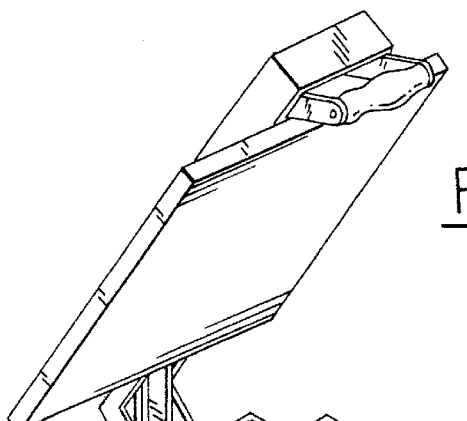
Figure 19:
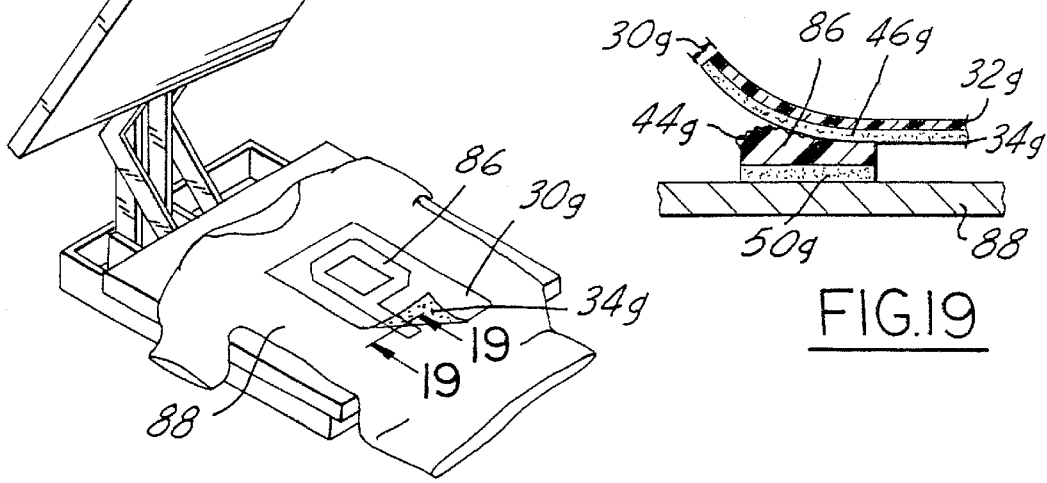

FIG. 9 is a front view of a carrier of the instant invention to which a decorative graphic having a graphic material of fabric has been applied;

FIG. 9A is a rear view of the embodiment of FIG. 9;

FIG. 9B is a cross-sectional view taken along the line 9B—9B of FIG. 9A;

FIG. 10 is a perspective view from the front of the registration of a second decorative graphic with a first graphic previously adhered to a fabric substrate;

FIG. 11 is a perspective view from the front of the removal of the carrier of the instant invention from a multi-colored, multiple component, decorative graphic immediately after application of a second decorative graphic to a previously applied first decorative graphic;

FIG. 12 is a rear view of a carrier of the instant invention to which a first decorative graphic has been applied;

FIG. 13 is a perspective view from the front of the registration of the carrier of FIG. 12 to a temporary support structure;

FIG. 14 is a perspective view from the front of the registration of a second decorative graphic to the first decorative graphic adhered to the temporary support structure of FIG. 13;

FIG. 15 is a cross-sectional view taken along the line 15—15 of FIG. 14;

FIG. 16 is a perspective view from the front of the removal of the carrier immediately after the application of the multiple component decorative graphic of FIG. 15 to a fabric substrate;

FIG. 17 is a cross-sectional view taken along the line 17—17 of FIG. 16;

FIG. 18 is a perspective view from the front of an embodiment of the instant invention employing a thermoplastic material having a puffing agent activated by heat as the graphic material of the decorative graphic; and FIG. 19 is a cross-sectional view taken along the line 19—19 of FIG. 18.

DETAILED DESCRIPTION OF THE PREFERRED EMBODIMENT

Turning now to FIGS. 1 and 2, the carrier 30 of the invention is illustrated. As indicated in FIG. 2, the carrier 30 is comprised of a substantially transparent plastic film 32 and a layer of carrier adhesive 34. The transparency of plastic film 32 is not significantly reduced by the layer of carrier adhesive thereon. Thus, the carrier 30 is itself substantially transparent.

Substantially transparent plastic film 32 must be flexible and strong enough to withstand cutting when the carrier is used in a laminate and individual graphics are cut therefrom. It should have a melting temperature of 400° F. or more so as to withstand all processing temperatures likely to be encountered. The plastic film may be in the form of a sheet or a roll. Preferably, the plastic film 32 will be comprised of a polyester film and most preferably will be comprised of a transparent, heat stabilized polyester film commercially available as MYLAR®[1] or MELINEX®[2]. The plastic film 32 will generally have a thickness of from 1 to 10 mils. More preferably, the plastic film 32 will have a thickness of about 3 to 7 mils and most preferably will have a thickness of about 5 mils.

[1]MYLAR® is a trademark of the Dupont Corporation of Wilmington, Del.

Carrier adhesive 34 will be positioned on side 40 of the plastic film 32. Side 40 is the rear or bottom surface of plastic film 32. Side 38 is the surface of film 32 opposite from side 40 and may be described as the front or upper surface of the carrier 30. Most preferably, carrier adhesive 34 will be a substantially contiguous layer positioned so as to lay on and be contiguous with side 40 of plastic film 32. Adhesive 34 will generally have a tackiness or stickiness such that at room temperature, the measurable peel strength of the carrier 30 will be from 4 to 20 ounces per square inch of width as measured by the ASTM D-903 or PSTC-1 180° peel adhesion tests. The peel strength at room temperature will generally be from 8 to 20 for "high tack" carriers and from 4 to 8 ounces per square inch for "low tack" carriers. High tack carriers will be utilized with graphic materials which are more difficult to bond securely. Most preferably, the peel value will be about 4 to 8 ounces per square inch.

With the application of sufficient heat to the carrier 30 to cause the adhesive 34 to reach temperatures of 200° F. or more, the measurable peel strength will decrease to a point which is substantially negligible, i.e, less than 1.0 ounce per square inch as measured by the foregoing tests. Temperatures of from 300 to 350° F. are most preferred. As a result, assuming that said heat is applied during a graphic adherence process, the carrier 30 will be capable of immediate removal from a just applied graphic. In addition, the reduced peel strength will allow said immediate removal to occur with a minimum amount of upwardly applied force. As a consequence the immediate removal of the carrier will not damage the just applied graphic. Those skilled in the art will appreciate that some just applied graphics may be vulnerable to damage or distortion as a result of upwardly directed ripping or pulling forces.

Although other adhesives may be suitable, particularly desirable carrier adhesives has been achieved with the use of an acrylic/isocyanate adhesive. In general, it has been found that the isocyanate concentration appears to control the peel strength of the carrier adhesive at room temperature.

Illustrative examples of suitable acrylic resins are those commercially available from Avery Dennison Chemical Division of Millhall, Pa. as specialty pressure sensitive acrylic solution adhesives for removable applications having the code numbers AS-2401 and AS-2402. Such acrylic resin solutions may have a total solids ranging from approximately 30 to 70% non-volatile and most preferably from 40 to 60% non-volatile. Viscosities of between 10,000 to 20,000 cps and a weight per gallon of from 7.0 to 7.5 pounds per gallon are characteristic of these materials. of these materials, AS-2402 is most preferred for use in preparing the carrier adhesive 34.

Sufficient isocyanate resin will be added to the acrylic solution so as to achieve the desired reversible tackiness quality of the carrier adhesive 34. Illustrative of a suitable isocyanate is Papi (R) 27 Polymeric MDI available from Dow Chemical Company of Midland, Mich. While other isocyanates may be suitable in the instant invention, this particular isocyanate is most preferred. It has about 40 to 50% of diphenylmethane diisocyanate containing methylene biphenyl isocyanate and from 50 to 60% polymethylene polyphenyl isocyanate.

Desirable strengths are generally achieved with the incorporation of less than 1.0% isocyanate resin on total acrylic solids. Such a composition will provide a carrier adhesive 34 having a peel strength of 4 to 20 ounces per square inch at room temperature and a peel strength of less than 3 ounces per square inch at temperatures of 200° F. or more. Preferably, low tack peel strengths of from 4 to 8 oz/in² will be obtained with 0.3% isocyanate resin on total acrylic solids. High tack peel strengths of from 8 to 20 are generally obtainable with 0.8 to 0.4% isocyanate resin on acrylic solids. The acrylic resin and isocyanate resin may be combined with a suitable organic solvent so as to achieve a spreadable or laminatable mixture which may be termed a dilute carrier adhesive. Preferably, sufficient toluene will be added so as to provide a dilute carrier adhesive having a % nonvolatile of from 30 to 70% and most preferably 50%.

The dilute carrier adhesive is applied to the plastic film 32 and sufficient heat applied to drive off the solvent and initiate the crosslinking of the adhesive solution. Ideally, the plastic film with its coating of dilute carrier adhesive will be subjected to an environment having elevated temperatures for a period of time sufficient to drive off the organic solvent and initiate crosslinking. Exposure in ovens having temperatures of from 200° to 325° F. for periods of from 1 to 5 minutes have been found to be sufficient. Most preferably, temperatures of around 300° F. will be used for 2 to 3 minutes.

Enough dilute carrier adhesive will be applied to the plastic film 32 to provide a carrier adhesive 34 having a final or use thickness of from 0.5 to 5 mils. Those skilled in the art will appreciate that this amount will be dependent upon the % nonvolatile of the dilute adhesive solution. Most preferably, the carrier adhesive will have a final thickness of about 2 mils.

Although not required, most preferably, the carrier 30 will further comprise an optional release sheet 36 illustrated in FIGS. 1 and 2. Optional release sheet 36 will most preferably be comprised of a thin thermoplastic film or paper film which lays upon and covers surface 41 of carrier adhesive 34. Examples of suitable thermoplastic release sheets are polyethylene, polyester, and polyproplyene. High density polyethylene is most preferred. It will be appreciated that the composition of the optional release sheet is not critical and that a variety of materials will suffice. The objective of the release sheet 36 is to protect the carrier adhesive 34 from the deleterious affects of dust and dirt during transport. As indicated in FIG. 1, optional release sheet 36 may be peeled back to expose carrier adhesive 34. The carrier 30 covered with release sheet 36 may be cut into sheets or rolled to facilitate transport to the desired location of use. Alternatively, the carrier 30 may be rolled without the use of release sheet 36.

Turning now to FIGS. 3–6, it can be seen how the carrier 30 of the instant invention may be utilized in a laminated web for the production and application of graphics to be adhesively applied to a substrate. The laminated web 42 of FIG. 3 is comprised of carrier 30a which is as described above with respect to carrier 30 of FIGS. 1 and 2 except that optional release sheet 36 has been removed and is not present. As illustrated in FIG. 4, laminated web 42 contains and is comprised of carrier 30a. Carrier 30a is made of substantially transparent plastic film 32a and carrier adhesive 34a having a peel strength which reversibly decreases with increasing temperature. Plastic film 32a and carrier adhesive 34a are as described above with respect to plastic film 32 and carrier adhesive 34 of FIGS. 1 and 2.

As shown in FIG. 4, arrayed on top of the carrier adhesive 34a is a layer of decorative or graphic material 44. Graphic material 44 is the material from which graphic 52 will be cut from. It may be pigmented or colored so as to provide the desired aesthetic or ornamental appearance. Graphic material 44 is preferably a substantially contiguous layer arrayed on and in intimate contact with the surface 41a of carrier adhesive 34a. Surface 41a is opposite from the surface 39a of carrier adhesive 34a which is in contact with the surface 40a of plastic film 32a. It will be appreciated that the surface 46 of graphic material 44 will serve as the visible or upper portion of the decorative graphic 52 which will ultimately be applied to a substrate using the laminated web 42.

Graphic material 44 may be selected from any material which can be adhered to a substrate using a graphic adherent means and from which it is desirable to cut a graphic from such as plastics, paper and fabric. However, for the purposes of laminate 42, the graphic material 44 must be held securely enough so as not to move or shift relative to carrier adhesive 34a during the graphic cutting process. Preferably, material 44 will be a thermoplastic or a thermoplastic containing material present as a substantially contiguous layer. While a variety of thermoplastic materials are suitable for use in the instant invention, preferably graphic material 44 will be a polyurethane or vinyl material such as those respectively discussed in U.S. Pat. No. 4,423,106 to Mahn and U.S. Pat. No. 5,112,423 to Leibe, Jr, herein incorporated by reference. Most preferably, graphic material will be a polyurethane.

Suitable types of polyurethane are sold by BF Goodrich as Tuftane 312 or Tuftane 322. Another suitable source of polyurethane is Deerfield Plastics of Deerfield, Mass. Most preferably, the substantially contiguous layer of graphic material 44 will be the polyurethane material commercially available from Stahls', Inc. of St. Clair Shores, Mich. as THERMOFILM®[3].

[3]THERMOFILM® is a trademark of Stahls', Inc. of St. Clair Shores, Mich.

Preferably, the substantially contiguous layer of graphic material 44 should have a film thickness of from 1 to 6 mils and most preferably a film thickness of approximately 2 to 4 mils. It may be formed by solution casting onto carrier adhesive 34a, by extrusion and rolling or laminating. Polyurethane films formed by extrusion and rolling or laminating, such as Stahls' "THERMOFILM"® are most preferred.

On the surface 48 of graphic material 44 is laid a substantially contiguous layer of a means 50 for adhesively adhering a graphic to a substrate. The graphic adherent means 50 may be of the types generally disclosed in U.S. Pat. No. 5,122,423 to Leibe, Jr. and U.S. Pat. No. 4,423,106 to Mahn, previously incorporated by reference. Preferably, graphic adherent means 50 will be a thermoplastic adhesive such as a polyester, polyurethane or mixtures thereof. Examples of commercially available polyester adhesives are Bostik 4103 Hot Melt Adhesive, and Bostik 4117 Polyester Extrusion Polymer. Polyurethane adhesives such as B.F. Goodrich's Estane 58409 may also be used. These adhesives have activation temperatures generally less than 320° F. Most preferably, the graphic adherent means 50 will be that which is available on Stahl's THERMOFILM®.

Those skilled in the art will appreciate that graphic adherent 50 may in general be any adhesive which is capable of adhering a graphic comprised of a desired graphic material 44 to a desired substrate. However, graphic adherent means 50 may not be of a type which will be adversely affected by the application of heat sufficient to cause the necessary reduction in the peel strength of the carrier 30a so as to allow for immediate removal of the carrier 30a.

Preferably, the graphic adherent means 50 will be such that adherence of the graphic material 44 to a desired substrate will occur upon the application of sufficient heat or pressure and most preferably upon application of a combination of both. Most preferably, the graphic adhesive 50 will be activated, i.e., adhere to the desired substrate, when the combination of heat and pressure includes sufficient heat so as to lower the peel value of the carrier such that immediate carrier removal is possible i.e., less than 1.0 oz/in$^2$.

However, it will be appreciated by those skilled in the art that the adherence of the graphic need not be contingent upon the application of heat. Adhesives activated only by pressure, such as pressure sensitive adhesives, are suitable for use as graphic adherent means 50.

The graphic adherent means 50 will preferably have a film thickness of from 1 to 6 mils. Most preferably, a film thickness of about 2 to 3 mil will be used. It will be appreciated by those skilled in the art that the thickness of the layer of graphic adherent means 50 will be determinant upon the compositions of decorative material 44 and the identity of the substrate to which the graphic is to be adhered.

The laminated web 42 of FIGS. 3 and 4 may be achieved by the lamination of the carrier 30a with the layers of graphic material 44 and graphic adherent means 50 positioned so as to be in contact as discussed above. The three separate layers may be laminated together in a single lamination step or layers 44 and 50 may have been previously laminated together prior to lamination with carrier 30a. Most preferably, layers 44 and 50 will be laminated together as disclosed in U.S. Pat. No. 4,423,106. It is most preferable to do this first since the lamination of layers 44 and 50 involves the application of heat which could reduce the tack of carrier adhesive 34a. In the event that the three separate layers are laminated together, heat insufficient to reduce the peel strength of carrier 30a will be used.

Subsequently, the resulting laminate will then be laminated to carrier 30a using two NIP rollers to exert pressure only or a combination of pressure and temperatures too low to affect the peel strength of carrier adhesive 34a. Combinations of pressure and temperature are most preferred. Such temperatures will generally be from about 80 to 100° F. Pressures of about 10 to 15 pli (per linear inch) are most preferably exerted by the two NIP rollers.

Once the laminated web 42 has been formed, decorative graphics 52 may be formed. It will be appreciated by those skilled in the art that the term decorative graphic includes but is not limited to lettering, logos, numerical shapes, arbitrary ornamental shapes, animal shapes, and in general all shapes having a particular symbolism or pleasing appearance. Furthermore, the term decorative graphics may be used to describe a compilation of individual shapes which provide a particular symbolism or appearance. Such a compilation of individual decorative graphic shapes 52 is illustrated in FIG. 3 in reverse. Thus, both the "S" of "STAHLS"[4] and "STAHLS" itself in FIG. 3 are a decorative graphic 52.

[4]STAHLS® is a trademark of Stahls', Inc., of St. Clair Shores, Mich.

As illustrated in FIG. 4, the decorative graphic 52 will be achieved by the cutting of the outline of the desired decorative graphic in reverse into the laminated web 42. The cuts 54 will extend only through the graphic adherent means 50 and graphic material 44. Carrier 30a will most preferably not be cut and will not have cut lines 54 extending therethrough, although scoring of the surfaces of 41a and 40a may occur.

The cutting of the outline of the decorative graphic 52 may be achieved by the use of any one of a variety of cutting methods well known in the art. Illustrative examples include the use of carbide knives, laser cutting, and kiss cuts using a wide variety of dies such as steel ruled dies, magnesium dies and rotary dies, etc. A suitable example of a rotary die is illustrated in U.S. Pat. No. 4,405,501 to Stahls. Most preferably, however, a computer guided or controlled blade such as that disclosed in U.S. Pat. No. 4,467,525, will be employed. The use of a computer aided cutting means is most preferred because the most highly intricate and detailed decorative graphics may be achieved. It will be appreciated that the use of such cutting means is possible because of the strong adherence of the surface 46 of graphic material 44 to carrier adhesive 34a. The peel strength of carrier 30a will most preferably be high enough at room temperature such that graphic material 44 is held securely enough so as to allow the formation of very intricate and detailed decorative designs with the use of the computer aided blades. Peel values of from 4 to 20 at room temperature are sufficient, values of from 5 to 10 are most preferred.

After the cutting of the outline of the desired decorative graphic, those portions of graphic adherent means 50 and graphic material 44 which are in the spaces surrounding the outline are removed or "weeded out." As illustrated in FIG. 3, those portions 56 which are outside the outline 58 formed by the cuts 54 will be removed or weeded out. It will be appreciated that because of the peel strength of the carrier adhesive 34a, the use of particular tools may be required to facilitate the removal of the undesired portions 56.

It will be appreciated that FIG. 3 contains unweeded decorative graphic 53 and weeded decorative graphic 55. It will be appreciated that in decorative graphic 55, carrier adhesive 34a is visible, while in unweeded decorative graphic 53, only graphic adherent means 50 is visible.

In FIG. 4, it may be seen that undesirable portions 56 surround and are weeded from those portions of layers 50 and 44 which comprise decorative graphic 52, which is, in this instance, the "S" and "T" of "STAHLS".

Figure 5:
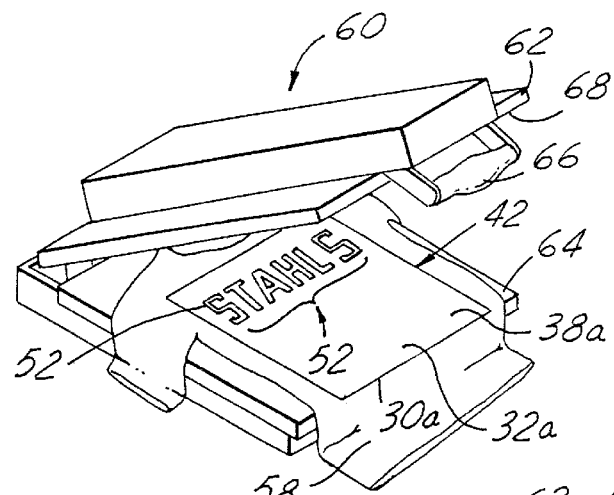
FIG. 5 is a perspective view of the laminated web of FIG. 3 being applied to a fabric substrate.

FIG. 5 illustrates the application of the decorative graphic 52 to a fabric substrate 58 using the laminated web 42. Note that in FIG. 5, all portions of decorative material 44 and graphic adherent means 50 which do not comprise the decorative graphic 52 have been removed from the laminated web 42. The laminated web 42 is positioned over the desired fabric substrate 58 in such a manner that the decorative graphic 52 will be positioned exactly as it will be ultimately adhered. This process may be referred to a registration of the graphic with the substrate. It will be appreciated that the transparent carrier 30a is highly advantageous in this regard since there is no way to correct any errors in alignment or positioning once the graphic 52 is adhesively adhered.

When the laminated web 42 is so positioned, the graphic adherent means 50 will be in intimate contact with the fabric substrate 58 and, where graphic adherent means 50 and graphic material 44 have been weeded out, carrier adhesive 34a will be in intimate contact with substrate 58. In general, laminated web 42 will be juxtaposed or laid on top of substrate 58.

Substrate 58 may be any substrate to which it is desirable to adhere another material. Examples of illustrative substrates are plastics, paper, fabric, and combinations thereof. It will be appreciated, however, that suitable substrates will be those which are not damaged by the heat which must be applied to provide for the immediate removal of carrier 30a. Fabric substrates are most preferred. Suitable fabric substrates include natural fibers such as cotton and wool as well as synthetics such as polyester, rayon, etc.

FIG. 5 illustrates the use of heat sealing machine 60. Such a heat sealing machine is disclosed in U.S. Pat. No. 5,167, 750, previously incorporated by reference. The heat sealing machine 60 will in general have an upper platen 62 and a lower platen 64. Upper platen 62 may be brought down so as to be parallel to lower platen 64 with the use of handle 66. In such a manner, it will be appreciated that the lower surface 68 of upper platen 62 will be in intimate contact with the first surface 38a of substantially transparent plastic film 32a of carrier 30a.

The upper platen 62 will be so positioned for a period of time sufficient to deliver enough heat or heat and pressure to adhere graphic 52 to substrate 58. It will be appreciated that the amount of heat and pressure applied and the length of time in which the upper platen is held parallel to lower platen 64 will be dependent upon the composition of graphic adherent means 50, graphic material 44 and substrate 58. However, at a minimum, sufficient heat will be applied so that the carrier 30a reaches a temperature of 250° F. or more. This is necessary if immediate removal of the carrier 30a can be expected once the graphic 52 is applied to substrate 58. Preferably heat in the range of from 200 to 350° F. will be applied concurrent with pressures of from 1 to 20 psi. Most preferably, temperatures of from 300 to 350° F. and pressures of from 1 to 6. In general, adherence cycles of from 3 seconds to 30 seconds will be sufficient although times in the range of 1 or more minutes are possible. Most preferably, when using the heat sealing machine 60, adherence cycles of 3 to 30 seconds will be used.

Figure 6:
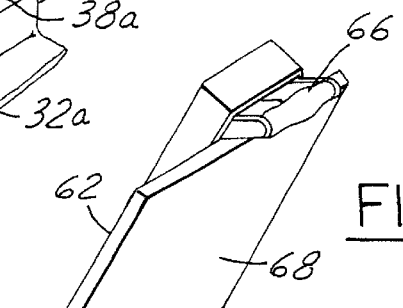
FIG. 6 is a perspective view of the laminated web of FIG. 3 being removed immediately after application of the desired decorative graphic to a fabric substrate.

At the completion of the adherence cycle, the carrier 30a is removed from substrate 58 and adhered graphic 52' as illustrated in FIG. 6. The carrier 30a may be removed immediately from the substrate 58 while the peel strength of carrier 30a and carrier adhesive 34a is less than 1.0 ounce per square inch. This presumes, however, that temperatures of 200° F. or more have been applied. It will be appreciated that with such peel strengths, the amount of upward force which must be applied to remove carrier 30a from the adhered graphic 52' and substrate 58 is essentially negligible. This is particularly advantageous since the still hot adhered graphic 52' may be vulnerable to distortion and disruption from the forces normally required to remove prior art carriers. It will be appreciated that when carrier 38 cools back to room temperature, carrier adhesive 34a will regain its tack and 'stickiness' sufficient that the peel strength will be between 4 to 20 ounces per square inch and most preferably 5 to 10 ounces per square inch. Those skilled in the art will appreciate that this reversible characteristic of adhesive 34a allows for the reuse of carrier 30a.

If the bond strength between graphic adherent 50 and the substrate 58a is greater than the bond between carrier adhesive 34a and graphic material 50, the carrier 30a may be removed while at room temperature. In general, however, immediate removal of carrier 30a will be strongly preferred, since it reduces the application time required for each graphic.

Figure 7:
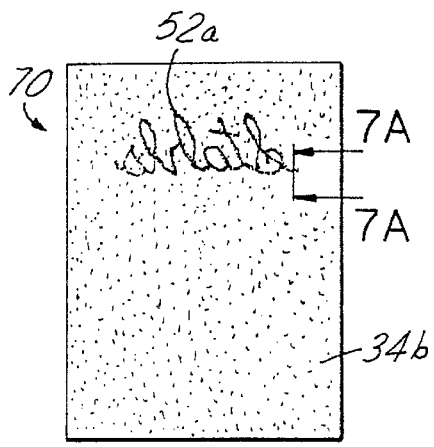
FIG. 7 is a plan view of the carrier of the instant invention to which a decorative graphic having a graphic material comprised of flock has been applied.
Figure 7A:
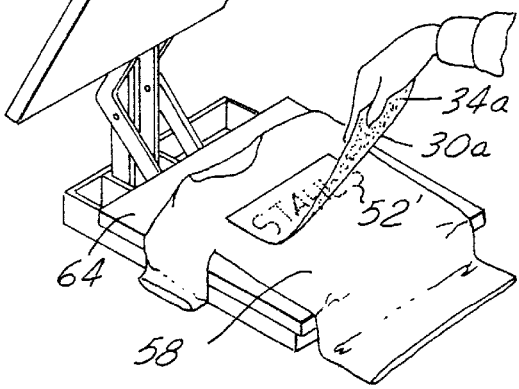
FIG. 7A is a cross-sectional view taken along the line 7A—7A of FIG. 7.
Figure 7A:
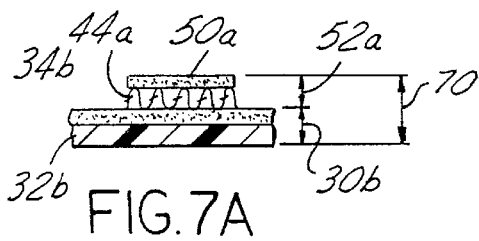

Turning to FIGS. 7 and 7A, an alternate method of employing the carrier of the instant invention may be utilized. In FIG. 7, the carrier of the instant invention serves as carrier means 70 for preformed or precut decorative graphic 52a. Turning to FIG. 7A, it will be seen that carrier means 70 is comprised of carrier 30b which is comprised of substantially transparent plastic film 32b and carrier adhesive 34b. Graphic 52 is laid on top of carrier 30b such that decorative material 44a is laid directly on carrier adhesive 34b so as to be in intimate contact therewith. In FIG. 7A it may be seen that decorative material 44a is comprised of a flock material. Such flock is commercially available from Stahls', Inc. of St. Clair Shores, Mich. under the tradename THERMOFLOCK®.

It will be appreciated that decorative graphic 52a may be cut with any of the above described cutting means. It will be appreciated that the manner of their formation is not a part of the instant invention.

Figure 8A:
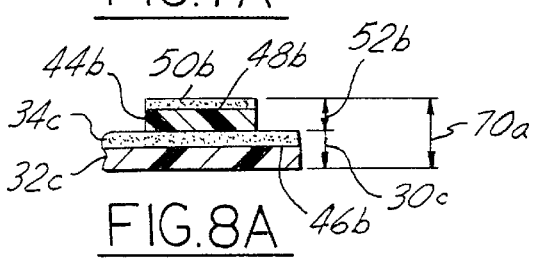
FIG. 8A is a cross-sectional view taken along the line 8A—8A of FIG. 8.
Figure 8:
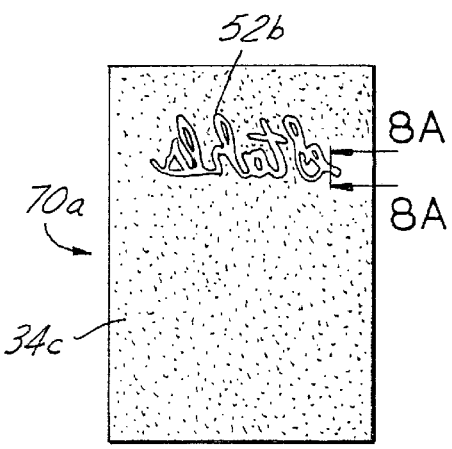
FIG. 8 is a rear view of the carrier of the instant invention to which a decorative graphic having a graphic material comprised of vinyl has been applied.

When the carrier of the instant invention is employed as a carrier means 70, the decorative graphics applied and carried thereon may have a variety of compositions. For example, as indicated in FIGS. 8 and 8A, the decorative graphic 52b may be comprised of graphic material 44b which is a vinyl material such as polyvinylchloride. Examples of suitable vinyl compositions are those described in U.S. Pat. Nos. 3,662,212 and 5,112,423. The film thickness of decorative material 44b will preferably be from 1 to 12 mils and most preferably 2 to 4 mils. It will be appreciated that the vinyl material 44b may be pigmented to provide a desired color or aesthetic appearance.

Decorative vinyl graphic 52b will be precut or formed by one of the aforementioned cutting means and will be positioned with the visible surface 46b laid directly on carrier adhesive 34c. The opposite surface 48b is juxtaposed and in intimate contact with graphic adherent means 50b. Graphic adherent means 50b will be as discussed above. Most preferably, 50b will be a pressure sensitive adhesive.

It will be appreciated that carrier 30c in FIGS. 8 and 8A is comprised of substantially transparent plastic film 32c and carrier adhesive 34c which are as generally described above.

The carrier means 70 and 70a of FIGS. 7 and 8 will be employed in the process of applying decorative graphics to a substrate, in the manner discussed above and illustrated in FIGS. 5 and 6. It will be appreciated that with both carriers 70 and 70a, the decorative materials 44a and 44b are securely held to carrier adhesives 34b and 34c such that the decorative graphics 52a and 52b may be arranged as desired and retained thereon so that the application of the decorative graphics to the desired substrate may be accomplished in a swift and easy fashion.

Those skilled in the art will appreciate that with the use of the carrier 30 in carrier means of the type 70 and 70a illustrated in FIGS. 7 and 8, it will be possible to quickly and easily apply a variety of inexpensive and precut decorative graphics to a wide variety of substrates and in a multitude of unique and varying decorative designs. The use of carrier means 70 and 70a will provide for the production of an endless number of unique and personalized decorative graphics made from a finite pool of common elements. For example, a supply of all the letters of the alphabet will allow for the fast and easy production of an endless variety of logos.

Another advantage of the incorporation of the carrier 30 into carrier means 70 is the ability to use decorative graphics comprised of a wide variety of graphic materials 44. FIGS. 9, 9A, and 9B illustrate a portion of a carrier means 70b employing as a decorative graphic 52c a fabric letter. The fabric letter of the instant invention is of the type disclosed and illustrated in U.S. Pat. No. 5,149,388 to Stahls' which is herein incorporated by reference.

As indicated in FIG. 9B, decorative graphic 52c is comprised of decorative or graphic material 44c, barrier layer 72 and graphic adherent means 50c. Graphic material 44c may be comprised of any fabric type material such as cotton, twill, felt, etc. The visible surface 46c of graphic material 44c is most preferably in contiguous and direct contact with the carrier adhesive 34d of carrier 30d. Opposite surface 48c of graphic material 44c is in similar contact with the barrier layer 72.

Barrier layer 72 may be a thermoplastic material such as an acrylic, polyester, etc. The primary requirement of barrier layer 72 is that it have a higher melting point than that of graphic adherent 50c. Barrier layer 72 is advantageous because it prevents the immigration of graphic adherent means 50c into fabric layer 44c. It will be appreciated that barrier layer 72 is optional to the practice of the instant invention and is merely a component of the most preferred type of fabric graphic.

Graphic adherent means 50c will be as disclosed above and will preferably be a pressure and heat activated adhesive. Most preferably, the adhesive 50 will be activated when heat sufficient to reduce the peel strength of carrier adhesive 34d to a value which allows for immediate removal of carrier 30d is applied along with pressure of from 1 to 6 psi.

It will be appreciated that the decorative graphic of FIGS. 9, 9A and 9B will be applied to various substrates in a manner analogous to that illustrated in FIGS. 5 and 6.

Turning now to FIGS. 10 through 17, the application of the carrier of the instant invention to the production of and application of decorative graphics having multiple components and colors will be illustrated. FIG. 11 illustrates the application of a multi-colored, multiple component decorative graphic 74. Although the heat sealing machine illustrated in FIGS. 5 and 6 is not present, those skilled in the art will appreciate that its use or an equivalent capable of applying sufficient heat or heat and pressure is implied. The carrier 30e is being removed immediately after the application of sufficient heat to cause the carrier 30e to be at a temperature of 250° F. or more. As a result, the carrier 30c is removed with a negligible amount of upwardly applied force. Thus, no disruption or distortion occurs to still hot adhered graphic 74. The multi-colored, multiple component decorative graphic 74 may be made in either of two ways when utilizing the carrier of the instant invention.

Turning to FIG. 10, assuming that the garment 76 lays in the heat sealing machine 60 illustrated in FIGS. 5 and 6, a first decorative graphic 78 has been applied to a substrate 76. In this instance, substrate 76 is a fabric garment. It will be appreciated that first decorative graphic 78 may be applied in any of the manners previously discussed. That is, graphic 78 may be made and applied with a laminate of the type of laminated web 42 or may alternatively be a precut or formed graphic applied using a carrier means of the type of carrier means 70 and 70a. First decorative graphic 78 will have a graphic adherent means 50d and graphic material 44d. Graphic material 44d may generally be a thermoplastic material, fabric, flock, paper or combination thereof. Most preferably, the graphic material 44d will be comprised of a thermoplastic material such as polyurethane.

If a buyer of the garment 76 is in a store and wishes to have a multi component letter or graphic design immediately adhered to the garment or t-shirt of his or her choice, it may accomplished using sequential application of the various components of the desired multiple component graphic 74. Accurate and easy sequential applications are possible with the carrier of the instant invention. The reduction of the peel strength to a value which allows for immediate removal also insures that the carrier removal will not damage, distort or even shift the just-adhered graphic and substrate. Subsequent applications of graphics may occur without cooling and substrate repositioning delays.

After application of first decorative graphic 78 in the aforementioned manner, a second decorative graphic 80 may be positioned in a registered fashion with respect to first decorative graphic 78. Most preferably, however, second decorative graphic 80 will be comprised of the same materials discussed above with respect to first decorative graphic 78. Second graphic 80 be formed on a laminate of the type 42 or may be a preformed graphic applied to the carrier adhesive of a carrier to form a carrier means of the type 70 or 70a.

Second decorative graphic 80 may be positioned or registered as desired with respect to first decorative graphic 78. Those skilled in the art will appreciate the exact position of second graphic 80 will be dependent upon the desired decorative effect. Second graphic 80 may be of a contrasting color, shape and/or material with respect to the first graphic 78. It need not be applied directly onto the first applied graphic but may be partially or not at all in contact therewith. In all cases, however, the various components will be "joined" by virtue of the fact that they are adhered to the same substrate.

However, the most preferred type of multiple component graphic 74 is where the second decorative graphic 80 has a shape which corresponds to that of first decorative graphic 78 but is of a contrasting color and of a lesser size. The multi-colored, multiple component emblem 74 shown in FIG. 10 is illustrative of this type of multiple component graphic. It will be appreciated that in FIG. 10, application of second decorative graphic 80 to first decorative graphic 78 will be in a manner exactly as discussed above with respect to the use of laminated web 42 and carrier means 70. As far as the application of second decorative graphic 80 in FIG. 10 is concerned, first decorative graphic 78 is in no way different than underlying substrate 76. As a result of the application of heat sufficient to cause the peel strength of carrier adhesive 34e to be substantially negligible, i.e. less than 1.0 ounce per square inch of width, no alteration, distortion, or misalignment of second decorative graphic 80 will occur with respect to first decorative graphic 78 when carrier 30e is removed. As previously indicated, this is because no abrupt pulling or ripping force need be applied when immediate removal of carrier 30e is desired. Thus, no distortion of the multi-colored, multiple component decorative graphic 74 results.

It will appreciated by those skilled in the art that previously existing graphics could be modified in such a manner. That is, previously applied graphics may be updated or altered with the subsequent addition of new decorative graphics having contrasting colors, shapes or sizes. In either case, the method illustrated in and described with respect to FIGS. 10 and 11 enables the rapid and easy production of multi-colored graphics. Such a method has been previously unattainable because prior art carriers required the application of substantial upward force for the removal of the carrier from the graphic adherent substrate particularly immediate carrier removal; Upwardly applied pulling and ripping forces commonly resulted in damage to or distortion of the underlying substrate and/or just-applied decorative graphic. Also, sequential positioning and application of decorative graphic components was extremely difficult without a substantially transparent carrier.

In some instances, however, it is desirable to obtain a multi-colored, multiple component decorative graphic which may be applied in one application step. FIGS. 12, 13, 14, and 15 illustrate the incorporation of the carrier of the instant invention into a carrier means 70c for a multi-colored, multiple component decorative graphic 74a. FIG. 16 illustrates the application of the multi-colored, multiple component decorative graphic 74a.

Turning to FIG. 13, the making of the carrier means 70c, visible in FIG. 15, begins with the application of the first decorative graphic 78a to temporary support structure 84. Suitable temporary support structures will be materials which will have a bond strength with the graphic adherent 50e which is greater than the bond strength between the graphic material 44c and the carrier adhesive 34f when the carrier adhesive 34f is at elevated temperatures of 250° F. or more. However, this same temporary support structure must have a bond strength with the graphic adherent means 50e which is less than the bond strength between the graphic material 44e and the carrier adhesive 34f when the carrier adhesive 34f is at room temperature. The temporary support structure 84 will preferably be a sheet of plastic, paper, or like material having release properties thereon. Most preferably, the temporary support structure 84 will be a polyester sheet of from 2 to 0.5 mils commercially available from Custom Coating and Laminating of Wooster, Mass. as 72 Matt Release Coated Film. This material must be heat shrunk prior to its first use as temporary support structure 84 in order to impart heat stability.

The carrier 30*f* is most preferably removed immediately after application of sufficient heat or heat and pressure to cause graphic adherent means 50*e*, visible in FIG. 12, to temporarily adhere to the support structure 84. It will be appreciated that this step is analogous to the preceding discussions regarding the application of graphics using the carrier of the instant invention, i.e. see FIGS. 5 and 6.

In FIG. 14, second decorative graphic 80*a* has been applied to the surface of the adhered first decorative graphic 78*a*. Second decorative graphic 80*a* is attached on its upper surface 46*f* to the carrier adhesive 34*f*. Note that while the carriers used in FIGS. 13 and 14 have the same numerical designation, it is not necessary that the same carrier be used in the application of both the first decorative graphic and the second decorative graphic. If, as illustrated in FIG. 14, the carrier 30*f*, used to apply the first decorative graphic 78*a*, is reused to apply the second decorative graphic 80*a* to the surface of the first decorative graphic 78*a*, the second decorative graphic 80*a* may be put on the carrier adhesive 34*f* by hand in the manner described above with respect to the embodiment of FIGS. 7–9B. However, it will be appreciated that second graphic 80*a* could be applied using a laminated web of the type 42 as discussed above.

Second decorative graphic 80*a* will most preferably be of a shape corresponding to that of first decorative graphic 78*a* but will be of a contrasting or different color and lesser size. As illustrated in FIGS. 10–16, the contrast between a first decorative graphic colored black and a second decorative graphic colored white provides the pleasing appearance of a white letter outlined in black. However, this is not necessary to the practice of the invention. Shape, size and color limitations of the various components of the multiple component graphic 74*a* are solely dependent upon the desired appearance of the multiple component graphic 74*a*. It will be appreciated that decorative graphics of any size, shape, and color may be used to make the multilayer type graphics disclosed herein. Also the various graphic components need not be continuously in contact with each other. They may be overlapping or in close proximity to each other.

It will be seen in FIGS. 14 and 15 that the upper surface 46*f* of second decorative graphic 80*a* is in intimate contact with the carrier adhesive 34*f* of the carrier 30*f*. The application of sufficient heat and/or pressure, causes the graphic adherent means 50*f* of second decorative graphic 80*a* to adhere to the surface 46*e* of the decorative or graphic material 44*e* of first decorative graphic 78*a*.

However, in this instance, the carrier 30*f*, comprised of plastic film 32*f* and carrier adhesive 34*f*, is not removed immediately after the adherence of second decorative graphic 80*a* to first decorative graphic 78*a*. A decorative composite thus results.

Rather, the decorative composite is allowed to cool back to room temperature. As a result, the peel strength of carrier adhesive 34*f* increases such that the bond strength between it and the second decorative graphic 80*a* and first decorative graphic 78*a* is greater than the bond between the temporary support substrate 84 and the graphic adherent means 50*e* of second decorative graphic 78*a*. As illustrated in FIG. 15, support structure 84 is then removed from graphic adherent means 50*e* of first decorative graphic 78*a*. As a result of the bond strength between the graphic material 44*e* of first decorative graphic 78*a* and graphic adherent means 50*f* of second decorative graphic 80*a*, a multi-colored, multiple component decorative graphic 74*a* is achieved. The upper surface of graphic 78*a* is 46*f* which is in direct and intimate contact with carrier adhesive 34*f* of carrier 30*f*. The carrier means 70*c* thus results from the removal of temporary support structure 84.

Turning to FIGS. 16 and 17, the carrier means 70*c* may be used to apply the multi-colored, multiple component decorative graphic 74*a* to the substrate garment 82 by inverting the carrier means 70*c* such that the graphic adherent means 50*e* is in an intimate contact with substrate 82. Upon the application of sufficient heat and pressure, the graphic adherent means 50*e* will adhere the multicolored, multiple component graphic 74 to the underlying fabric substrate 82. Immediately after application of said heat, carrier 30*f* will be removed. As a result, of the decreased and substantially negligible peel strength of the carrier 30*f*, no distortion, misalignment or disturbance occurs to the multi-colored, multiple component decorative graphic 74*a* with respect to its positioning on garment 82.

FIG. 17 provides a cross-section of the multi-colored, multiple component decorative graphic 74 on the underlying substrate garment 82. FIG. 17 is a cross section at the point of removal immediately after application of sufficient heat so as to cause the temperature of the carrier 30*f* to be 250° F. or more. Here it can be seen that a first decorative graphic 78*a* is adhered by its graphic adherent means 50*e* to fabric substrate 82. Graphic material 44*e*, which may be seen as black in FIGS. 12, 13, 14 and 16, is adhered to second decorative graphic 80*a* by means of second decorative graphic 80*a*'s graphic adherent means 50*f*. Immediately after application of graphic 74 to substrate 82, carrier 30*f* removes easily and without distortion to the underlying structure because of the decreased peel value of carrier adhesive 34*f*.

It will be appreciated that this method of making the multi-colored, multiple component decorative graphic 74 presents many advantages over the prior art. The carrier means 70*c* may be transported as desired and stored for subsequent one step application to a desired substrate such as a fabric or garment substrate.

Finally, FIGS. 18 and 19 illustrate an alternative composition for a decorative material used to make a decorative graphic. FIG. 18 illustrates a decorative material which has the capability of puffing or expanding upon the application of sufficient heat and or pressure. As illustrated in FIG. 18, a decorative graphic 86 is applied using the carrier 30*g* having a layer of carrier adhesive 34*g* applied thereon. It will be appreciated that as illustrated in FIG. 19 that carrier 30*g* is comprised of substantially transparent plastic film 32*g* and carrier adhesive 34*g*. Adhered to carrier adhesive 34 and in intimate contact therewith is decorative material 44*g*. Decorative or graphic material 44*g* is a puffed material comprised of a thermoplastic material having ingredients therein which cause it to puff or expand upon the application of heat and/or pressure. Illustrative example of a suitable puff materials are disclosed in U.S. Pat. No. 4,735,854. The graphic material 44*g* has a visible surface 46*g* which is exposed when carrier 30*g* is removed. Graphic material 44*g* which forms the visible surface of the decorative graphic 86 is adhered to the underlying substrate 88 by virtue of graphic adherent means 50*g*.

It will be appreciated that the use of such puff or expandable material is particularly suitable with the instant invention. The instant removal of the carrier 30g will allow the uninterrupted and uninhibited expansion of the puffed material 44g. As a result, high quality puffed or expanded decorative graphics are obtainable.

As various modifications may be made in the embodiments herein described and illustrated without departing from the scope of the invention, it is intended that all matter contained in the foregoing description were shown in accompanying drawings shall be interpreted as illustrative rather than limiting.

What is claimed is:

1. A flexible laminate for use in applying graphics to a substrate, comprising:

a carrier comprising:

transparent plastic film having opposite first and second surfaces the plastic film having a melting temperature of greater than 400° F.;

an adhesive having a peel strength which decreases with increasing temperature, the adhesive being on the second surface of the plastic film;

the adhesive having a peel strength between 4.0 to 20.0 ounces per square inch of width at room temperature and less than 3 ounces per square inch of width at temperatures of greater than 200° F.; and the adhesive comprising a mixture of an acrylic resin and an isocyanate resin wherein the adhesive has less than 1% isocyanate resin on total acrylic solids in the adhesive so that the carrier can be quickly removed following application of the graphic to the substrate;

a substantially contiguous layer of a thermoplastic containing material, the thermoplastic material being on the adhesive; and a substantially contiguous layer of a means for adhering a graphic, the graphic adherent means being on the layer of thermoplastic containing material to provide a flexible laminate from which graphics may be cut.

2. The laminate of claim 1 wherein the thermoplastic is selected from the group consisting of polyurethane or vinyl, wherein the vinyl is selected from the group consisting of polyvinyl chloride, partially carboxylated polyvinyl chloride and non-carboxylated polyvinyl chloride.

3. The laminate of claim 1 where the plastic film is comprised of polyester.

4. The laminate of claim 3 where the polyester film has a thickness between 3.0 to 7.0 mils.

5. The laminate of claim 1 where the adhesive is a substantially contiguous layer on the second surface of the plastic film.

6. The laminate of claim 5 where the layer of adhesive is from 0.5 to 5.0 mils thick.

7. The laminate of claim 1 wherein the means for adhering a graphic is responsive to heat to adhere said substantially contiguous layer of a means for adhering a graphic to a substrate, the adhesive on the second surface of the plastic film has a peel strength, immediately after application of said substantially contiguous layer of a means for adhering a graphic to a substrate when it is desirable to remove the carrier, which is less than the corresponding peel strength of said means, whereby the carrier may be removed while said substantially contiguous layer of a means for adhering a graphic is still at substantially the temperature for adhering it to a substrate.

8. The laminate of claim 1 wherein the substrate is a fabric.

* * * * *